United States Patent
Chang et al.

(10) Patent No.: US 12,306,684 B2
(45) Date of Patent: May 20, 2025

(54) DYNAMIC CONTROL MECHANISMS FOR BACKUP POWER REGULATORS

(71) Applicant: ZEBRA TECHNOLOGIES CORPORATION, Lincolnshire, IL (US)

(72) Inventors: Tong-Hsiao Chang, Manhasset, NY (US); Rohit D. Kotwal, Plainvew, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/078,643

(22) Filed: Dec. 9, 2022

(65) Prior Publication Data

US 2024/0195208 A1    Jun. 13, 2024

(51) Int. Cl.
```
G06F 1/26     (2006.01)
G06F 1/28     (2006.01)
G06F 1/30     (2006.01)
G06F 11/20    (2006.01)
H02J 7/00     (2006.01)
H02J 7/34     (2006.01)
H02J 9/06     (2006.01)
```
(52) U.S. Cl.
CPC ............. *G06F 1/263* (2013.01); *G06F 1/28* (2013.01); *G06F 1/30* (2013.01); *G06F 1/305* (2013.01); *G06F 11/2015* (2013.01); *H02J 7/0045* (2013.01); *H02J 7/0047* (2013.01); *H02J 7/0063* (2013.01); *H02J 7/00712* (2020.01); *H02J 7/345* (2013.01); *H02J 9/06* (2013.01); *H02J 9/061* (2013.01)

(58) Field of Classification Search
CPC ... G06F 1/263; G06F 1/28; G06F 1/30; G06F 1/305; G06F 1/3212; G06F 11/2015; H02J 7/0045; H02J 7/0047; H02J 7/0048; H02J 7/0063; H02J 7/0068; H02J 7/00712; H02J 7/345; H02J 9/06; H02J 9/061; H02J 9/068
See application file for complete search history.

(56) References Cited

U.S. PATENT DOCUMENTS 5,835,366 A  * 11/1998  Pleso ................... H02J 7/0068
                                                   363/59
6,366,783 B1 *  4/2002  Hasegawa ............. G04G 21/04
                                                   455/352

(Continued)

OTHER PUBLICATIONS

International Search Report and Written Opinion for International Application No. PCT/US23/82109 mailed on Mar. 13, 2024.

*Primary Examiner* — Thomas J. Cleary

(57) ABSTRACT

A computing device includes: a battery compartment configured to removably receive a battery; a backup power source; a computing subsystem configured to receive power from a selectable one of the battery and the backup power source; a backup power regulator configured to supply backup power from the backup power source; and a power control subsystem configured, in response to detecting removal of the battery from the battery compartment, to: control the backup power regulator to increase an output voltage level of the backup power; and supply power to the computing subsystem from the backup power regulator.

16 Claims, 5 Drawing Sheets

(56) References Cited

U.S. PATENT DOCUMENTS

| | | | |
|---|---|---|---|
| 7,737,581 B2* | 6/2010 | Spurlin | H02J 9/061 |
| | | | 307/66 |
| 2007/0182368 A1* | 8/2007 | Yang | H02J 5/00 |
| | | | 320/110 |
| 2008/0111423 A1* | 5/2008 | Baker | H02J 7/02 |
| | | | 307/64 |
| 2015/0177808 A1* | 6/2015 | Sarti | H05K 7/1492 |
| | | | 713/300 |
| 2015/0263561 A1* | 9/2015 | Trock | H02J 7/0048 |
| | | | 320/135 |
| 2015/0312048 A1* | 10/2015 | Bodo | H04L 12/10 |
| | | | 713/300 |
| 2016/0146892 A1 | 5/2016 | Lee et al. | |
| 2018/0080992 A1* | 3/2018 | Kadirvel | G01R 31/3842 |
| 2019/0280508 A1 | 9/2019 | Tabib et al. | |
| 2020/0010034 A1* | 1/2020 | Xavier | H02J 9/06 |
| 2020/0274368 A1 | 8/2020 | Crouse, Jr. | |
| 2020/0366189 A1* | 11/2020 | Yamanaka | H02M 1/08 |
| 2021/0296708 A1* | 9/2021 | Alfaro | H02J 7/0013 |
| 2021/0312780 A1* | 10/2021 | Morita | G08B 17/113 |
| 2021/0327239 A1* | 10/2021 | Falkenburg | G01N 21/17 |
| 2022/0001838 A1* | 1/2022 | Yun | B60R 25/403 |
| 2022/0071827 A1* | 3/2022 | Phillips | H02J 9/06 |
| 2022/0224129 A1 | 7/2022 | Liu et al. | |

\* cited by examiner

DYNAMIC CONTROL MECHANISMS FOR BACKUP POWER REGULATORS

BACKGROUND

Various electronic devices, such as tablet computers and other mobile computing devices, may be supplied with electrical power from removable batteries (e.g., rechargeable battery packs). Certain devices may also include a backup source to supply power to internal components of the device while a rechargeable battery is removed and replaced, referred to as hot-swapping the battery. Under some operating conditions, however, battery hot-swapping can interrupt operation of the device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
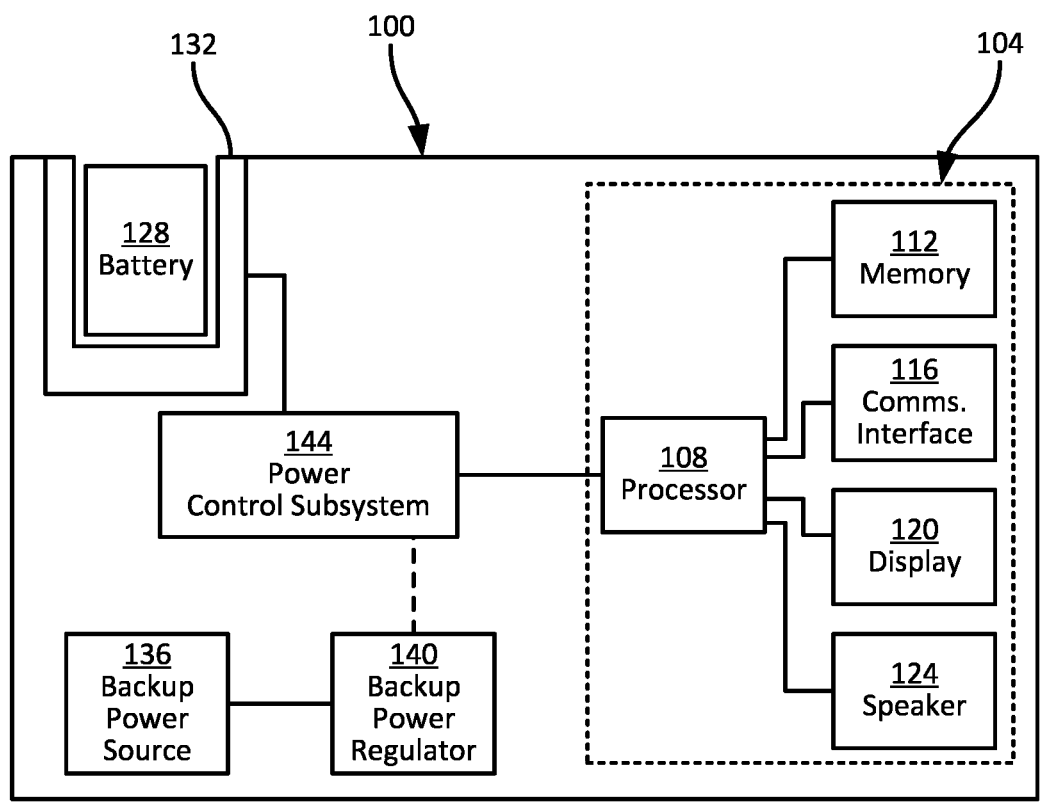
FIG. 1 is a diagram illustrating certain components of a computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device including: a battery compartment configured to removably receive a battery; a backup power source; a computing subsystem configured to receive power from a selectable one of the battery and the backup power source; a backup power regulator configured to supply backup power from the backup power source; and a power control subsystem configured, in response to detecting removal of the battery from the battery compartment, to: control the backup power regulator to increase an output voltage level of the backup power; and supply power to the computing subsystem from the backup power regulator.

Additional examples disclosed herein are directed to a method, comprising: supplying power to a computing subsystem of a computing device from a removable battery received in a battery compartment of the computing device; controlling a backup power regulator of the computing device to supply backup power from a backup power source at a nominal output voltage level; detecting removal of the battery from the battery compartment; in response to detecting removal of the battery, controlling the backup power regulator to increase the output voltage level of the backup power; and supplying power to the computing subsystem from the backup power regulator.

FIG. 1 illustrates an example electronic device, such as a mobile computing device 100 (e.g., a tablet computer, a smart phone, a mobile printer, a barcode scanner, or the like). The device 100 includes a housing containing or otherwise supporting various components, including a computing subsystem 104. The computing subsystem 104 can include a wide variety of components, depending on the function(s) implemented by the device 100. In the illustrated example, the computing subsystem 104 includes a processor 108, such as a central processing unit (CPU), graphics processing unit (GPU), or the like. The computing subsystem 104 also includes a non-transitory storage medium, such as a memory 112, storing computer-readable instructions executable by the processor 108 to implement a wide variety of functionality.

The computing subsystem 104 can also include a communications interface 116, e.g., including one or more wired communication ports, wireless transceivers, or the like. The interface 116 can facilitate communication between the device 100 and other computing devices over networks such as wireless local-area networks (WLANs) or the like. The computing subsystem 104 can further include output devices, such as a display 120 and a speaker 124. In some examples, the computing subsystem 104 can further include input devices such as touch screens, microphones, cameras, and the like. Via the execution of instructions by the processor 108 (e.g., the computer-readable instructions stored in the memory 112), the computing subsystem 104 can implement functions such as voice communication, image capture and processing, data storage, barcode scanning, and the like. In other examples, the computing subsystem 104 can include various other components enabling the device 100 to perform other functions, such as label printing, or the like.

The components of the computing subsystem 104 are supplied with electrical power to operate. For example, the electrical power supplied to the computing subsystem 104 can originate from a battery 128, such as a rechargeable battery pack removably received in a physical interface, such as a battery compartment 132 defined by the housing of the device 100. Operation of the device 100 consumes energy stored in the battery 128, and the battery 128 therefore periodically requires recharging. In some cases, the battery 128 can be recharged by plugging a power interface (not shown) of the device 100 into an external power supply (e.g., a wall outlet, or the like). Connecting the device 100 to an external power supply may impede operation of the device 100, however, and therefore in some cases, the battery 128 may be removed and replaced with another rechargeable battery. The removed battery 128 may then be recharged without interrupting operation of the device 100. Removal and replacement of the battery 128 while the device 100 is in operation is referred to as hot-swapping the battery 128.

To enable hot-swapping of the battery 128, the device 100 also includes a backup power source 136, such as a lithium-ion hybrid supercapacitor, a lithium-ion cell, or the like, configured to store energy to supply the load of the device 100 (e.g., the computing subassembly 104) for a period of time sufficient to remove the battery 128 and insert a fresh battery into the compartment 132. For example, the backup power source may store sufficient energy to enable continued operation of the device 100 for about 30 seconds, and state persistence in the memory 112 for about a further 60 seconds. A wide variety of other capacities can also be employed for the backup power source 136, however.

The device 100 also includes a backup power regulator 140, such as a buck/boost regulator configured to supply an adjustable output voltage for supplying power to the computing subsystem 104. The regulator 140, as will be apparent to those skilled in the art, can be configured to supply a stable output voltage, as the input voltage to the regulator 140 from the backup power source 136 varies over time, e.g., as the backup power source 136 is depleted. The output voltage level of the backup power supplied by the regulator 140 (e.g., the output voltage of the regulator 140) can be controlled by a power control subsystem 144, as will be described in greater detail below.

Output voltage supplied by the regulator 140 may be affected by the power demands of the computing subsystem 104. For example, certain functions implemented by the computing subsystem 104, such as voice or video communications via the communications interface 116 (e.g., particularly in environments with suboptimal wireless conditions, such as low received signal strength from an access point, leading to high power consumption by the communications interface 116), high display brightness (e.g., to facilitate visibility of the display 120 in bright environments), and the like may impose significant transient loads on the power control subsystem 144 and therefore on the active one of the power supply mechanisms (the battery 128 or the backup power source 136).

Figure 2:
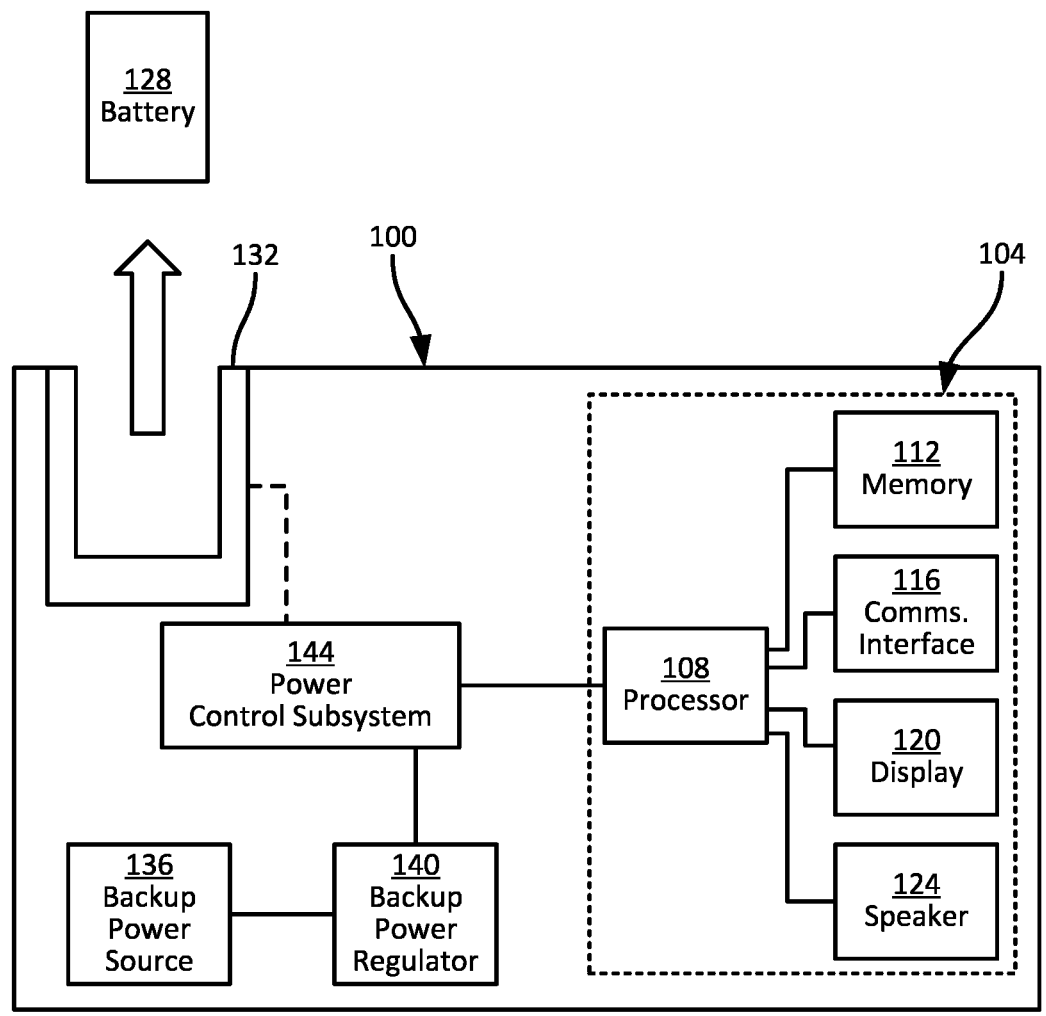
FIG. 2 is a diagram of the computing device of FIG. 1 following removal of a battery.

FIG. 1 illustrates the device 100 in a battery-powered state, in which a connection between the regulator 140 and the power control subsystem 144 is shown in dashed lines to indicate inactivity. When as shown in FIG. 2, the battery 128 is removed to replace the battery 128 with another (e.g., freshly charged) battery, the device 100 transitions to a backup-powered configuration, indicated by the dashed-line connection between the compartment 132 and the power control subsystem 144, and the solid-line connection between the regulator 140 and the power control subsystem 144. At the time of the hot-swap operation, the load imposed on the regulator 140 and the backup power source 136 by the computing subsystem 104 may be sufficient to cause a drop in the output voltage level at the regulator 140. Under certain conditions, such as the high-load conditions mentioned above, the voltage decrease at the output of the regulator 140 may be sufficiently large to trigger an undervoltage lockout (UVLO) detection at the power control subsystem 144. In response to the UVLO detection, the power control subsystem 144 may disable power to the computing subsystem 104 and shut down the device 100. Under such conditions, hot-swapping the battery 128 fails, because operation of the device 100 is interrupted before the battery 128 is replaced.

As will be discussed below, the power control subsystem 144 implements certain functionality to mitigate the effects of high power demand by the computing subsystem 104 on the output voltage of the regulator 140, and thereby reduce the likelihood of a UVLO-associated shutdown of the device 100 during a hot-swap operation.

Figure 3:
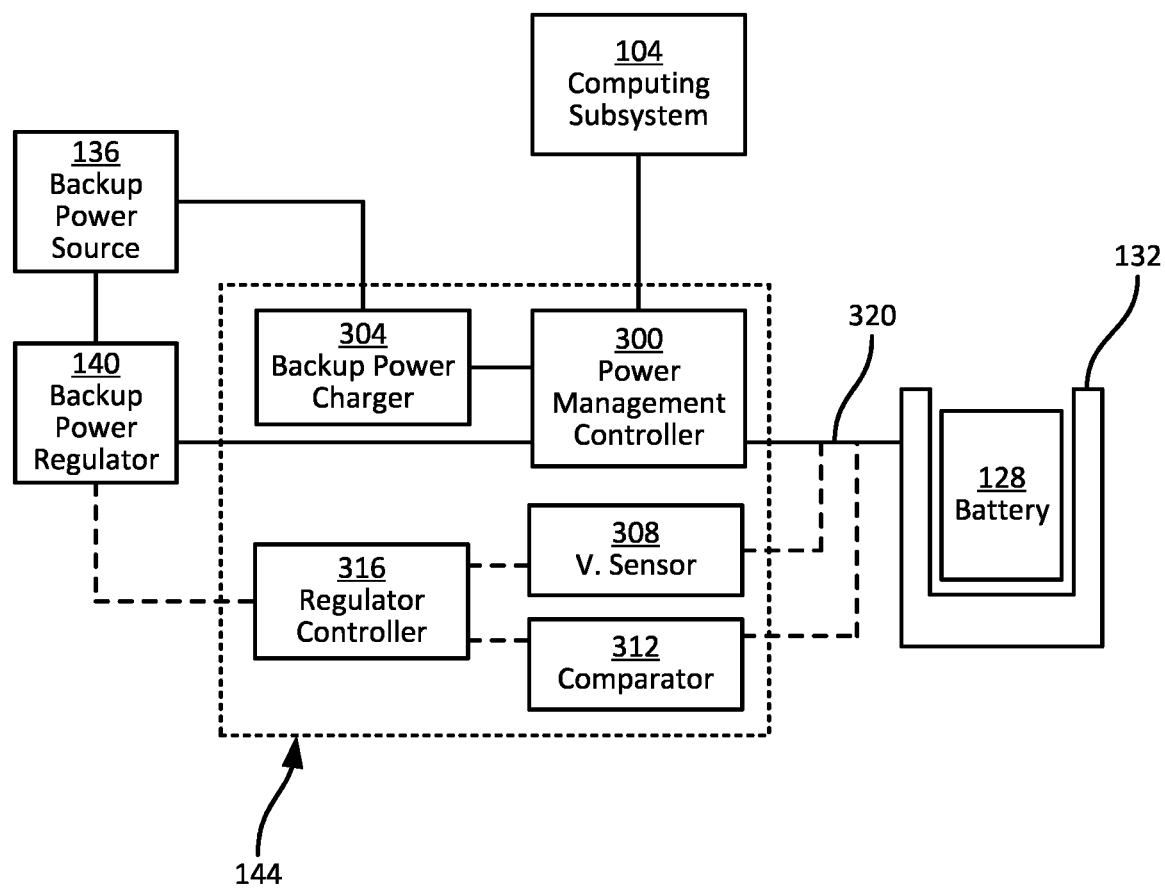
FIG. 3 is a diagram illustrating certain components of a power control subsystem of the device of FIG. 1.

Turning to FIG. 3, certain components of the power control subsystem 144 are illustrated. Power-delivery connections between components are illustrated in solid lines, while control and/or signaling connections are illustrated in dashed lines. In particular, the power control subsystem 144 includes a power management controller 300 (e.g., a power management integrated circuit, or PMIC), configured to select between supplying the computing subsystem 104 with power from the regulator 140 or the battery 128. The controller 300 is also configured to monitor a voltage supplied to the computing subsystem 104 (e.g., referred to as a system voltage, or Vsys), and to trigger a UVLO-associated shutdown if the system voltage falls below a UVLO threshold. The controller 300 can also perform various other functions, including supplying power from the battery 128 to the backup power source 136, via a backup power charger 304.

The power control subsystem 144 also includes components configured to detect removal of the battery 128 (that is, to detect a battery pull event), and to control the backup power regulator 140 in response to such detection. In the illustrated example, the power control subsystem 144 includes a voltage sensor 308, a current comparator 312, and a regulator controller 316. Any one or more of the sensor 308, the comparator 312, and the controller 316 can be integrated with the power management controller 300. In other examples, the sensor 308, the comparator 312, and the controller 316 can be deployed as a single distinct integrated circuit from the controller 300. In further examples, as illustrated in FIG. 3, and as discussed in further detail below, the sensor 308, the comparator 312, and the controller 316 are implemented as physically distinct components, e.g., separate integrated circuits.

The voltage sensor 308 is configured to monitor a voltage drop associated with the battery compartment 132, e.g., at a specific point on a power path 320 from the battery compartment 132 to the power management controller 300. The voltage drop may be monitored across a transistor-based switch on the path 320, such as a metal-oxide-semiconductor field-effect transistor (MOSFET) or other suitable switch. When the voltage drop measured across the switch exceeds a threshold indicating that the battery 128 has been removed from the compartment 132, the sensor 308 can generate a battery removal detection signal.

The battery removal detection signal is received at an input of the regulator controller 316, which is configured to control the backup power regulator 140 to increase a backup power output voltage level to a new setpoint in response to a battery pull event. For example, the backup power regulator 140 can be configured to supply backup power at a nominal output voltage of 3.1 V (although a wide variety of other output voltage levels can also be employed, depending on the power requirements of the computing subsystem 104). In response to a control signal from the regulator controller 316, the backup power regulator 140 can increase the output voltage level, e.g., to 3.6 V or the like. The increased output voltage level may be sufficient to avoid a UVLO-associated shutdown (e.g., at a supply voltage to the subsystem 104 of about 2.7 V) due to a voltage decrease at an output of the controller 300 due to transient load resulting from power-intensive functions performed by the computing subsystem 104. Such loads may be transient because software-based mitigation actions (e.g., reducing display brightness, speaker volume, and the like) may reduce power consumption by the computing subsystem 104. However, software mitigation may occur about 50 ms or more after a battery pull event, while the power management controller 300 may trigger a UVLO-associated shutdown within a shorter period of time (e.g., less than 10 microseconds).

In some examples, when the battery 128 is removed, the time elapsed until the threshold monitored by the sensor 308 is reached and the battery removal detection signal is generated may exceed the time period within which the controller 300 triggers a UVLO-associated shutdown. Detection of a battery pull event is therefore supplemented by the comparator 312, which is configured to monitor current along the path 320 from the battery compartment 132 to the power management controller 300. For example, the comparator can generate an output signal, received at the regulator controller 316, that is proportional to the detected current. As will be apparent, therefore, when the battery 128 is removed, current observed by the comparator 312 drops to zero substantially instantaneously, and the output of the comparator 312 therefore also indicates a battery pull event substantially instantaneously (e.g., in less time than a UVLO-associated shutdown can be triggered).

While the comparator 312 may respond more quickly to a battery pull than the sensor 308, the comparator 312 may also generate false positive battery pull detections, e.g., during momentary loss of contact between the compartment 132 and the battery 128 if the device 100 is dropped. The output signals of the sensor 308 and the comparator 312 are therefore employed together by the controller 316 in some examples, to detect and respond to battery pull events reliably (e.g., mitigating false positive detections) and quickly (e.g., before UVLO shutdowns are triggered by the controller 300).

Specifically, when the controller 316 detects a low signal from the comparator 312 (or, more generally, any signal from the comparator 312 indicating that current from the battery compartment 132 has fallen to zero), the controller 316 is configured to control the backup power regulator 140 to increase the output voltage level of backup power supplied to the power management controller 300 (for delivery to the computing subsystem 104) from a nominal level such as the above-mentioned level of 3.1 V, to an active output voltage level, e.g., such as 3.4 V, 3.6 V, or any other suitable level above the nominal level, selected to reduce the likelihood of a UVLO-associated shutdown.

The controller 316 can be configured to control the regulator 140 as noted above immediately upon receipt of a signal from the comparator 312 indicating loss of current from the battery compartment 132, e.g., prior to receipt of a signal from the sensor 308. In response to increasing the output voltage level at the regulator 140, the controller 316 can also initialize a timer, having a configurable expiry time period longer than the expected time for generation of the battery removal detection signal by the sensor 308. For example, the sensor 308 may be expected to generate the battery removal detection signal about 1 ms after a battery pull event, and the expiry time period may therefore be set at 1.5 ms. Various other expiry time periods may also be employed, however.

If, upon expiry of the time period, no battery removal detection signal has been received at the controller 316 from the sensor 308, the battery pull detection by the comparator 312 is interpreted as a false positive, and the controller 316 is configured to return the output voltage level of the regulator 140 to the nominal level mentioned earlier. If, however, the battery removal detection signal is received at the controller 316 from the sensor 308 prior to expiry of the time period, the controller 316 is configured to maintain control of the regulator 140 to generate the active output voltage level of backup power, because the receipt of detection signals from both the sensor 308 and the comparator 312 indicates a confirmed battery pull event. The elevated output voltage level from the regulator 140 is then maintained until current is detected along the path 320 once again, indicating that a battery 128 has been replaced in the compartment 132. At that point, the controller 316 is configured to control the regulator 140 to return the output voltage level to the nominal voltage mentioned earlier.

Figure 4:
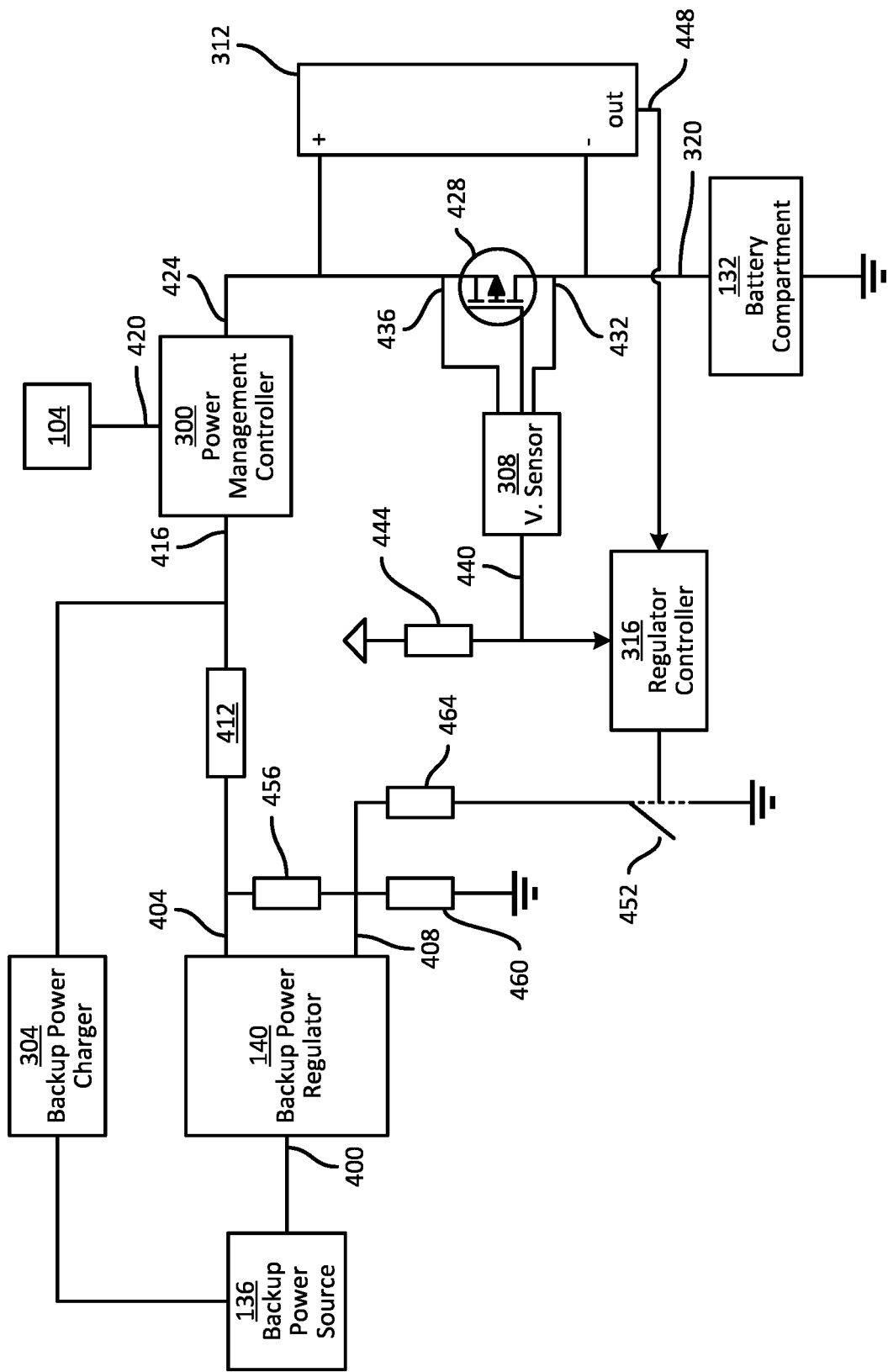
FIG. 4 is a circuit diagram of the power control subsystem of FIG. 3.

Turning to FIG. 4, an example circuit for implementing the power control subsystem 144 and associated components of the device 100 is illustrated. As mentioned earlier, the backup power regulator 140 can be implemented as a buck/boost regulator, having an input 400 from the backup power source 136, an output 404 to the controller 300, and a feedback input 408 connectable with the controller 316 to modulate the voltage at the output 404, as discussed below. The output 404 can connect to the power management controller 300 via a diode 412, preventing current from flowing from a port 416 of the controller 300 to the output 404 (as seen in FIG. 4, current is permitted to flow from the port 416 to the backup power charger 304, to charge the backup power source 136).

The power management controller 300 includes an output 420, e.g., to the computing subsystem 104, and an input 424, e.g., from the battery compartment 132. In some examples, the input 424 can be bidirectional, e.g., to permit charging of the battery via an external power source. The input 424 terminates the previously mentioned power path 320 from the battery compartment 132. The path 320 includes a transistor 428, such as an enhancement-type p-channel MOSFET, with a bias (gate) voltage supplied by the sensor 308, a drain terminal connected to the battery compartment 132, and a source terminal connected to the input 424. The sensor 308 can be implemented as an OR controller integrated circuit (IC), and monitors the voltage drop across the drain-source channel of the transistor 428 e.g., the from a drain voltage 432 to a source voltage 436. When the sensor 308 detects an increase of the source voltage 436 relative to the drain voltage 432 greater than a threshold (e.g., about 20 mV) indicating removal of the battery 128, the sensor 308 applies a battery removal detection signal on an output 440. For example, the output 440 can be an open-drain output connected with a pull-up resistor 444. The signal can be applied by activating the output 440 to apply a low signal to the controller 316. In other examples, the battery removal detection signal can be a high signal rather than a low signal.

The comparator 312 is configured, in the illustrated example, to monitor current flowing along the path 320, and to generate an output signal on a comparator output 448, connected to the regulator controller 316. The output signal of the comparator 312 is proportional to the current observed along the path 320. A low output signal on the output 448 of the comparator 312 can therefore indicate a potential battery pull event.

The regulator controller 316 is configured to monitor the signals from the sensor 308 and the comparator 312. In the illustrated example, when the signals are both high, the controller 316 sets a switch 452 in an open position, such that a voltage at the feedback input of the regulator 140 is determined by a first resistor 456 and a second resistor 460. The values of the first and second resistors 456 and 460 are selected to generate a nominal feedback voltage at the input 408, e.g., of about 0.5 V. For example, the first resistor 456 may have a value of about 475 kΩ, and the second resistor 460 may have a value of about 90 kΩ.

When low signals are detected on both inputs of the controller 316, or when a low input is detected from the comparator 312 and the previously mentioned time period has not yet expired, the controller 316 is configured to close the switch 452, connecting a control resistor 464 to the feedback input 408 of the backup power regulator 140. In such a configuration, the feedback voltage at the input is determined by the resistors 456 and 460, as well as the resistor 464. In the illustrated example, the resistor 464 may have a value of about 475 kΩ. Closing the switch 452 increases the feedback voltage at the input 408, and therefore increases the output voltage at the output 404 of the backup power regulator 140 (e.g., to about 3.6 V in this example). Insertion of a battery 128 in the compartment 132 returns the comparator signal to low, in response to which the controller 316 is configured to open the switch 452 and return the output voltage level of the regulator 140 to the nominal level.

The power management controller 300 can be configured to select between the backup power and battery power for supplying power to the computing subassembly 104. For example, the power management controller 300 may be configured to select the power source having the greater voltage. When the backup regulator 140 operates at the nominal output voltage level, the battery input voltage at the 424 is greater than the voltage at the port 416, and the controller 300 is configured to supply power to the computing subsystem 104 from the battery 128. When the backup regulator 140 operates at the active output voltage level and/or the battery 128 is removed, the controller 300 is configured to supply power to the computing subsystem 104 from the backup regulator 140.

Figure 5:
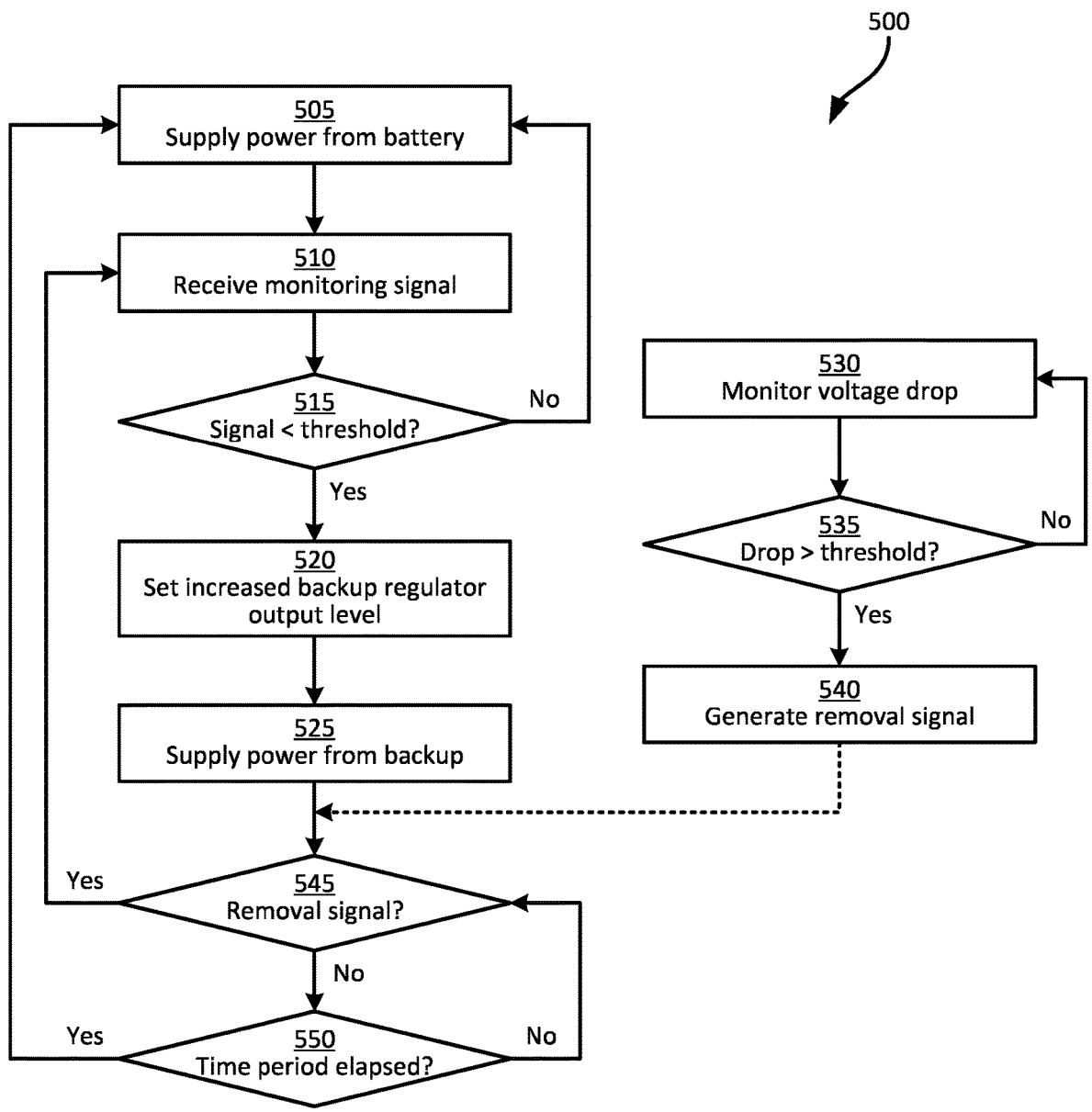
FIG. 5 is a flowchart of a method of dynamic backup power regulator control.

Turning to FIG. 5, a flowchart 500 of a dynamic backup power regulator control method is illustrated, e.g., as performed by the power control subsystem 144 and described above. At block 505, the controller 300 is configured to supply power to the computing subsystem 104 from the battery 128. At block 510, the controller 316 is configured to receive a current monitoring signal from the comparator 312, indicating the presence or absence of current flowing on the path 320. At block 515, the controller 316 is configured to determine whether the monitoring signal is below a threshold, e.g., indicating that current no longer flows on the path 320. When the determination at block 515 is negative, the controller 316 takes no action, e.g., the switch 452 remains open and the backup power regulator 140 remains in the nominal operating mode.

When the determination at block 515 is affirmative, at block 520 the controller 316 controls the backup power regulator 140 to increase the output voltage (e.g., the voltage at the output 404), e.g., by closing the switch 452. The controller 316 can also initialize a timer for the false positive detection expiry period mentioned earlier. At block 525, in response to the increase in the backup power output voltage level, the controller 300 can begin supplying power to the computing subsystem 104 from the backup power regulator 140 (i.e., from the backup power source 136).

In parallel with the performance of blocks 505 to 525, the sensor 308 monitors a voltage drop associated with the path 320 at block 530, and determines at block 535 whether the voltage drop exceeds a threshold. When the determination at block 535 is affirmative, indicating that the battery 128 has been removed, at block 540 the sensor 308 generates the battery removal detection signal. As noted above, generation of the battery removal detection signal generally occurs after detection of a cessation of current on the path 320 by the comparator 312.

At block 545, the controller 316 is configured to determine whether a battery removal detection signal has been received from the sensor 308. When the determination at block 545 is negative, the controller 316 determines at block 550 whether the time period initialized at block 525 (e.g., 1.5 ms) has elapsed. When the time period has not elapsed, the controller 316 continues monitoring for the presence of the removal signal from the sensor 308 at block 545. When the time period elapses at block 550 (e.g., because the determination at block 535 remains negative), the controller 316 opens the switch 452 or otherwise returns the backup power regulator 140 to the nominal output voltage level, and the controller 300 returns to supplying power to the computing subsystem 104 from the battery 128 at block 505. When the determination at block 545 is affirmative, indicating that a confirmed battery pull event has occurred, the expiry time period is terminated and the controller 316 returns to block 510 to monitor the signal from the comparator 312. Until the comparator signal returns to a level indicating that a battery 128 has been inserted in the compartment 132, the determination at block 515 remains affirmative and the backup power regulator 140 remains in the active-output state (e.g., with an elevated output voltage).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:
   a battery compartment configured to removably receive a battery;
   a backup power source;
   a computing subsystem configured to receive power from a selectable one of the battery and the backup power source;
   a backup power regulator configured to supply backup power from the backup power source; and
   a power control subsystem configured to:
      in response to detecting that current from the battery compartment is below a current threshold, supply power to the computing subsystem from the backup power regulator by controlling the backup power regulator to increase an output voltage level from a nominal level to an active level;
      in response to increasing the output voltage level of the backup power regulator, initiate a timer; and
      upon expiration of the timer:
         (a) continue to supply power to the computing subsystem from the backup power regulator, the output voltage level being set to the active voltage level,
         when a battery removal detection signal was received prior to expiration of the timer, and
         (b) discontinue supplying power to the computing subsystem from the backup power regulator, the output voltage level being set to the nominal voltage level, when the battery removal detection signal was not received prior to expiration of the timer.

2. The computing device of claim 1, wherein
   the power control subsystem is configured to apply a control signal to the backup power regulator to increase the output voltage level of the backup power from the nominal output voltage level to the active output voltage level.

3. The computing device of claim 2, wherein
   the power control subsystem is configured to:
   detect insertion of a replacement battery in the battery compartment; and
   in response to detecting insertion of the replacement battery, control the backup power regulator to return the output voltage level of the backup power to the nominal output voltage level.

4. The computing device of claim 1, wherein
   the power control subsystem comprises:
   a current comparator configured to generate a monitoring signal based on the current flowing from the battery compartment; and
   a controller configured to receive the monitoring signal, and increase the output voltage level of the backup power regulator when the monitoring signal falls below the current threshold.

5. The computing device of claim 4, wherein
   the power control subsystem further comprises:
   a voltage sensor configured, in response to detecting a voltage drop associated with the battery compartment that exceeds a voltage threshold, to generate the battery removal detection signal.

6. The computing device of claim 5, wherein
   the controller is configured to:
   receive the battery removal detection signal; and
   control the backup regulator to maintain the increased backup power output voltage at the active voltage level while the monitoring signal is below the current threshold.

7. The computing device of claim 1, wherein
   the power control subsystem further comprises:
   a power management controller configured to supply power to the computing subsystem from the backup power regulator or the battery.

8. The computing device of claim 7, wherein
   the power management controller is further configured to:
   monitor a voltage supplied to the computing subsystem; and
   disable power supply to the computing subsystem if the monitored voltage falls below an undervoltage lockout (UVLO) threshold.

9. The computing device of claim 1, wherein the backup power source includes a supercapacitor.

10. A method, comprising:
supplying power to a computing subsystem of a computing device from a removable battery received in a battery compartment of the computing device;
in response to detecting that current from the battery compartment is below a current threshold, supplying power to the computing subsystem from a backup power regulator by controlling the backup power regulator to increase an output voltage level from a nominal level to an active level;
in response to increasing the output voltage level of the backup power regulator, initiating a timer; and
upon expiration of the timer:
   (a) continuing to supply power to the computing subsystem from the backup power regulator, the output voltage level being set to the active voltage level, when a battery removal detection signal was received prior to expiration of the timer, and
   (b) discontinuing supplying power to the computing subsystem from the backup power regulator, the output voltage level being set to the nominal voltage level, when the battery removal detection signal was not received prior to expiration of the timer.

11. The method of claim 10, further comprising:
detecting insertion of a replacement battery in the battery compartment; and
in response to detecting insertion of the replacement battery, controlling the backup power regulator to return the output voltage level of the backup power to the nominal output voltage level.

12. The method of claim 10, further comprising
generating, at a current comparator, a monitoring signal based on a current flowing from the battery compartment; and
at a controller, receiving the monitoring signal and increasing the output voltage level of the backup power supply when the monitoring signal falls below the current threshold.

13. The method of claim 12, further comprising:
at a voltage sensor, in response to detecting a voltage drop associated with the battery compartment that exceeds a voltage threshold, generating the battery removal detection signal.

14. The method of claim 13, further comprising:
receiving the battery removal detection signal; and
controlling the backup power regulator to maintain the increased backup power output voltage at the active voltage level while the monitoring signal is below the current threshold.

15. The method of claim 10, further comprising:
at a power management controller, selecting between supplying power to the computing subsystem from the backup power regulator or the battery.

16. The method of claim 15, further comprising,
at the power management controller:
monitoring a voltage supplied to the computing subsystem; and
disabling power supply to the computing subsystem if the monitored voltage falls below an undervoltage lockout (UVLO) threshold.

\* \* \* \* \*